United States Patent [19]

Ampferer et al.

[11] Patent Number: 5,148,719
[45] Date of Patent: Sep. 22, 1992

[54] TORSIONAL-VIBRATION DAMPER

[75] Inventors: Herbert Ampferer, Sachsenheim; Rudolf Grandhuber, Neu-Ulm, both of Fed. Rep. of Germany

[73] Assignee: Dr. Ing. h.c.F. Porsche AG, Fed. Rep. of Germany

[21] Appl. No.: 329,550

[22] Filed: Mar. 28, 1989

[30] Foreign Application Priority Data

Mar. 30, 1988 [DE] Fed. Rep. of Germany ....... 3810764

[51] Int. Cl.[5] .......................... F16C 3/04; F16F 15/10
[52] U.S. Cl. .................................. 74/604; 74/574
[58] Field of Search ............... 74/574, 572, 573 R; 474/94, 903, 902, 158, 159, 164; 464/89, 87, 93, 180

[56] References Cited

U.S. PATENT DOCUMENTS

| 2,972,904 | 2/1961 | Troyer | 74/574 |
|---|---|---|---|
| 3,791,497 | 2/1974 | Fleischmann et al. | 74/574 X |
| 3,970,398 | 7/1976 | Wilson | 403/26 |
| 4,150,587 | 4/1979 | Bremer | 74/574 |
| 4,516,955 | 5/1985 | Worner et al. | 464/89 |
| 4,781,659 | 11/1988 | Gebhardt | 74/574 |

FOREIGN PATENT DOCUMENTS

| 0238231 | 9/1987 | European Pat. Off. | 74/574 |
|---|---|---|---|
| 726966 | 9/1942 | Fed. Rep. of Germany | 74/574 |
| 2537390 | 7/1977 | Fed. Rep. of Germany | 74/574 |
| 2829253 | 1/1980 | Fed. Rep. of Germany | 74/574 |
| 2829644 | 1/1980 | Fed. Rep. of Germany | 74/574 |
| 3616083 | 11/1987 | Fed. Rep. of Germany | 74/604 |
| 957698 | 2/1950 | France | 74/574 |
| 2279972 | 2/1976 | France | 403/26 |
| 2019578 | 10/1979 | United Kingdom | 403/26 |

Primary Examiner—Vinh T. Luong
Attorney, Agent, or Firm—Evenson, Wands, Edwards, Lenahan & McKeown

[57] ABSTRACT

A torsional-vibration damer is fastened on a crankshaft. It comprises a hub and a mass-body which is arranged to be offset in radial direction with respect to the hub. Between the torsional-vibration damper and the crankshaft are separate connections, one for torque transmission and the other for absorbing bending moments through radial supporting elements.

12 Claims, 1 Drawing Sheet

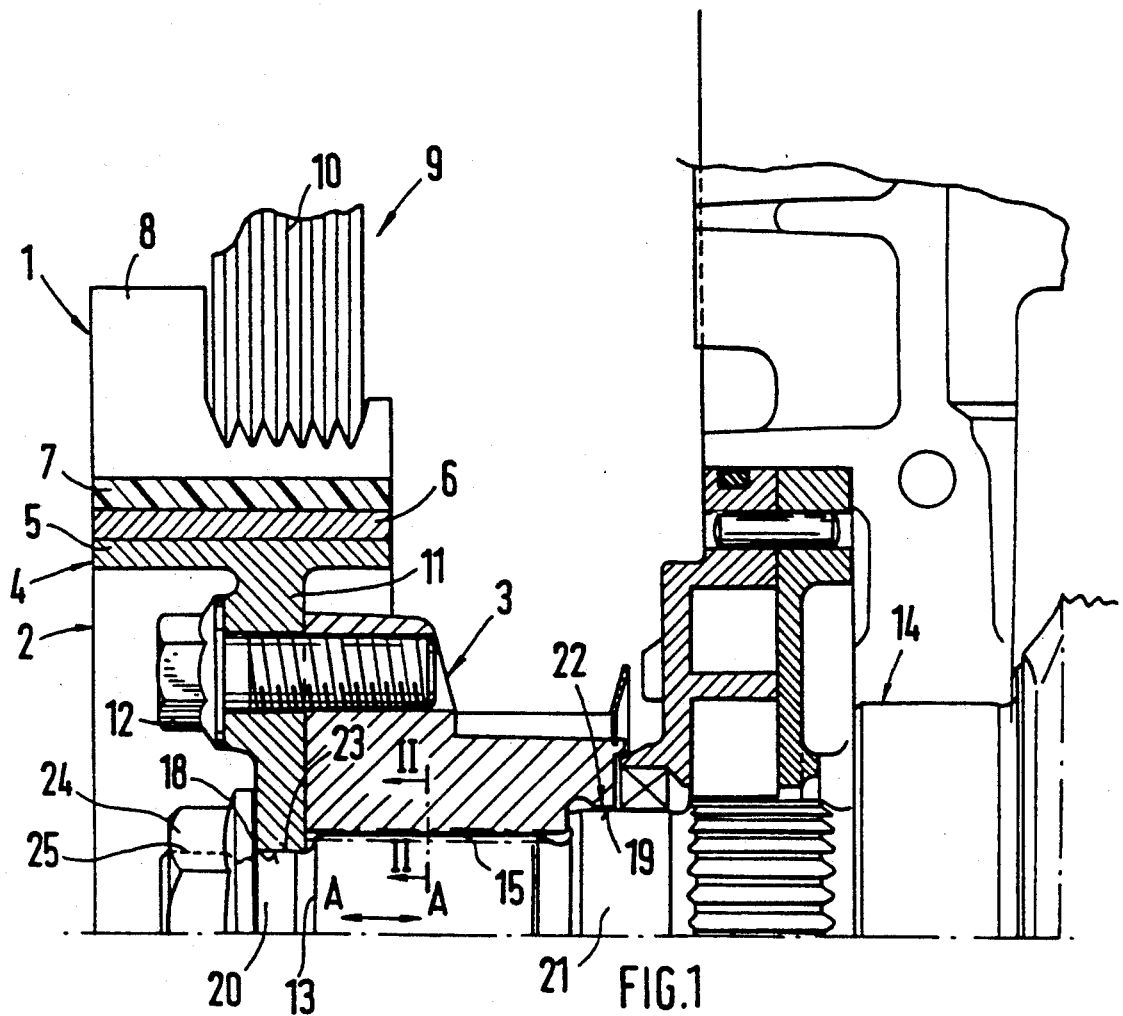
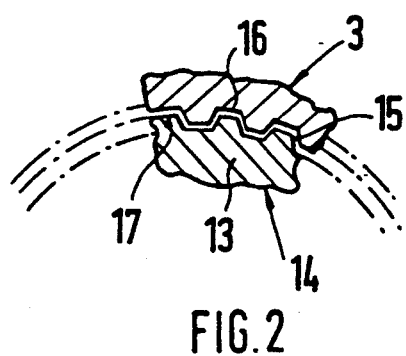
FIG.2

TORSIONAL-VIBRATION DAMPER

BACKGROUND OF THE INVENTION

1. Field of the Invention

The invention relates to a torsional vibration damper for connecting a drive from a mass body to a crankshaft of an internal-combustion engine, which comprises a hub fastened on the crankshaft by a drive device, and a mass body, which preferably is axially offset with respect to the hub and connected thereto.

2. Description of the Related Art

A known crankshaft torsional-vibration damper is shown, U.S. Pat. No. 2,972,904, and has a hub and a mass body. The latter, viewed in axial direction, is arranged to be offset with respect to the hub. This construction has the disadvantage that, during the operation of the internal-combustion engine, the device for the torque transmission between the crankshaft and the hub completely absorbs bending moments caused by imbalances of the torsional-vibration damper, which may result in an excessive stressing of the hub-shaft connection.

It is therefore the object of the invention to provide a torsional-vibration damper between the mass-body-hub and the crankshaft, that provides a torque transmission that meets the operational requirements and in which bending moments are absorbed effectively.

SUMMARY OF THE INVENTION

According to the invention, this object is achieved by having the torque transmission and the bending-moment absorption between the mass body-hub and the crankshaft be essentially separate from one another such that a torque drive device is used for the torque transmission, and the bending-moment absorption takes place by means of one or several spaced radial supporting elements.

Additional advantages are obtained if the torque drive is formed by an internal toothing of the hub and an external toothing of the crankshaft, which toothing extends over at least an axial partial area of the hub and if the supporting elements are formed by journal sections of the crankshaft and bores on the mass-body-hub.

The main advantages achieved by means of the invention are that the separation of the torque transmission and the absorption of the bending moment ensure a secure operation of the torsional-vibration damper on the crankshaft. In this case, the device for the torque transmission as well as the supporting elements for the bending-moment absorption between the torsional-vibration damper and the crankshaft may be implemented in a simple manner.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal section of a torsional-vibration damper which is connected with a crankshaft;

FIG. 2 is an enlarged sectional view according to Line II—II of FIG. 1.

DETAILED DESCRIPTION OF THE DRAWINGS

A torsional-vibration damper 1 is formed by a mass body 2 and a hub 3. The mass body 2 comprises a carrier 4 having a circular receiving ring 5, an intermediate ring 6, an elastic ring body 7 and a mass part 8, which at 9 cooperates with a multiple belt 10. The receiving ring 5 is equipped with a radial web 11 which is connected with the hub 3 by means of one or several screws 12.

The hub 3 is arranged on a journal 13 of a crankshaft 14 of an internal-combustion engine of the piston type which is not shown in detail. Between the hub 3 and the journal 13, a device 15 is provided for the torque transmission. This device is formed by means of an internal toothing 16 of the hub 3 and an external toothing 17 of the journal 13 of the crankshaft 14. Both toothings 16 and 17 extend in axial direction A—A of the hub 3 and of the journal 13.

The mass body 2, in axial direction A—A, is arranged to be offset with respect to the hub 3, whereby bending moments are generated between the hub 3 and the journal 13 when the internal-combustion engine is operated. In order to absorb the bending moments, axially spaced radial supporting element 18, 19 are provided between the torsional-vibration damper 1 and the crankshaft 14. The supporting elements 18, 19 are formed by means of journal sections 20, 21 of the crankshaft 14 and bores 22, 23 of the hub 3 and of the web 11. The supporting elements 18, 19 are axially arranged on both sides of device 15. The internal toothing 16 and the external toothing 17 (FIG. 2) are constructed such tat the occurring bending moments are essentially absorbed by the supporting elements 18, 19.

For fastening the torsional-vibration damper 1 on the crankshaft 14, a screw nut 24 is used which fixes the web or the hub 3 of the torsional-vibration damper 1 in axial direction and cooperates with a thread 25 of the crankshaft 14.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A torsional-vibration damper arrangement for an internal combustion engine, comprising
   a hub,
   drive means drivingly connecting the hub with an internal combustion engine crankshaft;
   and a mass body which is connected to the hub and is axially offset with respect thereto;
   wherein the drive means includes interengageable driving members at the hub and crankshaft which operate to transmit driving torque between the crankshaft and hub;
   wherein radial supporting element means are provided for absorbing bending moment forces between the mass body and the crankshaft, said radial supporting element means being separate from the drive means;
   wherein the drive means is formed by an internal toothing of the hub and an external toothing of the crankshaft, which toothing extends over at least an axial partial area of the hub; an wherein one of said radial supporting element means includes a bearing support means located at one axial end of the toothing of the drive means.

2. A torsional-vibration damper arrangement according to claim 1, wherein the radial supporting element means are spaced axially from one another.

3. A torsional-vibration damper arrangement according to claim 1, wherein the radial supporting element means are formed by journal section means of the crankshaft and bore means on at least one of the hub and mass.

4. A torsional-vibration damper arrangement according to claim 3, wherein there are at least two radial supporting elements, two journal sections and two bore means and wherein one bore means, is on the hub and a second bore means is on the mass body.

5. A torsional-vibration damper arrangement according to claim 1, in which the mass-body has a radial web connected with the hub, and wherein the radial supporting element means includes a bore provided at the web.

6. A torsional-vibration damper arrangement according to claim 3, in which the mass-body has a radial web connected with the hub, and wherein the radial supporting element means includes a bore provided at the web.

7. A torsional-vibration damper arrangement according to claim 1, wherein the supporting element means has portions arranged at two locations with respect to a the drive means.

8. A torsional-vibration damper arrangement according to claim 2, wherein the supporting element means has portions arranged at two locations with respect to the drive means.

9. A torsional-vibration damper arrangement according to claim 3, wherein the supporting element means has portions arranged at two locations with respect to the drive means.

10. A torsional-vibration damper arrangement according to claim 4, wherein the supporting element means has portions arranged at two locations with respect to the drive means.

11. A torsional-vibration damper arrangement according to claim 5, wherein the supporting element means has portions arranged at two locations with respect to the drive means.

12. A torsional-vibrational damper arrangement according to claim 6, wherein the supporting element means has portions arranged at two locations with respect to the drive means.

* * * * *